Jan. 12, 1937.  C. C. SMITH  2,067,796
ELECTRIC CORD AND ATTACHMENT CAP
Filed April 27, 1933
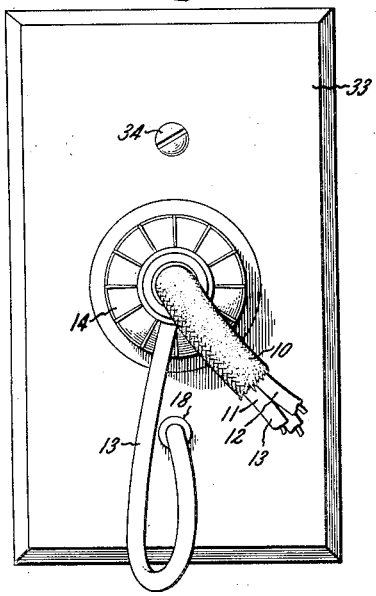
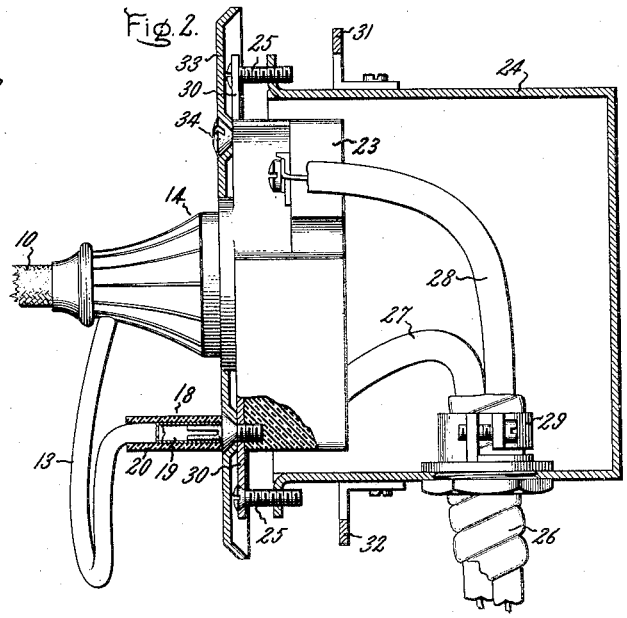
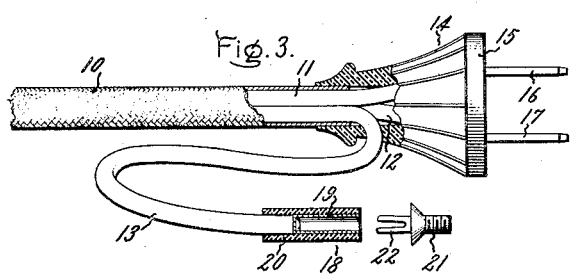
Inventor:
Charles C. Smith,
by Chas E. Tullar
His Attorney.

Patented Jan. 12, 1937

2,067,796

UNITED STATES PATENT OFFICE 2,067,796

ELECTRIC CORD AND ATTACHMENT CAP

Charles C. Smith, Nichols, Conn., assignor to General Electric Company, a corporation of New York Application April 27, 1933, Serial No. 668,188

1 Claim. (Cl. 173—332)

My invention relates to an electric cord and attachment cap and more particularly to an electric cord and attachment cap provided with a means for connecting the device to which the electric cord is connected to ground.

In the use of electric appliances such as washing machines, vacuum cleaners, ironers and the like, difficulty has been experienced due to contact between one of the electric conductors connecting the device to the power circuit and metal parts of the device. This may result in the operator of the device receiving an electric shock upon touching a metal part of the device. In the case of a washing machine for example, there is not only the danger of the operator receiving an electric shock but there is the added danger that the one receiving the electric shock by an involuntary movement may come in contact with a moving part of the washing machine and may sustain serious injury. In some parts of the country requirements have been made that such devices be provided with a separate ground connection for the metal parts. Providing such a ground connection is not easy, especially when the device may be moved from one position to another and connected to the supply circuit at different points. It is possible to use a three-conductor electric cord set and an attachment cap with three prongs to provide the ground connection through the attachment cap but this necessitates a special receptacle for the attachment cap. This is undesirable because it requires the replacement of the receptacle by one of special design and the device may not be moved to another locality to connect it unless a special receptacle is provided at that point.

The object of my invention is to provide an electric cord and attachment cap which will provide a detachable connection for a conductor to connect the metal parts of the device to which the cord is connected to ground.

Another object of my invention is to provide an electric cord and attachment cap which accomplishes the above purpose and is adapted to fit any of the usual types of receptacles as generally provided in the house wiring circuit.

What I consider to be novel and my invention will be better understood by reference to the following specification and appended claims, when considered in connection with the accompanying drawing.

In the accompanying drawing, Fig. 1 is a plan view of my improved cord and attachment cap connected to a receptacle; Fig. 2 is a side view partly in section of the device illustrated in Fig. 1, and Fig. 3 is a side elevation of my improved electric cord and attachment cap shown partly in section.

Referring to the drawing, 10 indicates an electric cord with three conductors 11, 12 and 13 with the usual insulating covering for the conductors and an overall braid. On the end of electric cord 10 is an attachment cap 14 consisting of a molded rubber plug 15 provided with the customary metal blades or prongs 16 and 17 projecting from the end, to which conductors 11 and 12 are connected. Conductor 13 is adapted to be connected to the metal parts of the device to which the electric cord is adapted to supply electric current. Conductor 13 extends from the side of the molded rubber plug 14 and is provided with a detachable connector 18 which is adapted to complete a connection to ground through the receptacle to which the attachment cap is connected. Detachable connector 18 consists of a metal tube 19 which is connected to the end of conductor 13 and a sleeve 20 of insulating material which surrounds tube 19 and extends a short distance beyond the end of the tube over the insulation of conductor 13. Sleeve 20 is provided surrounding tube 19 to insulate the tube so that in the event that the metal parts of the device to which cord 10 is connected should be in contact with conductors 11 or 12 and plug 14 should be connected to a receptacle before the ground connection is completed through detachable connector 18, the one completing the ground connection will not receive a shock by coming in contact with tube 19. For cooperation with detachable connector 18 there is provided a metal member or screw 21 having an expanding plug 22 extending from its head and consisting of a cylindrical member split longitudinally. Plug 22 is adapted to fit within tube 19 and retain its position of contact therewith by frictional engagement with the walls of the tube.

Referring to Figs. 1 and 2, an arrangement of plug receptacle or attachment cap receptacle 23 is illustrated located in an outlet box 24 provided therefor. The receptacle 23 is secured in outlet box 24 by means of screws 25. A metal armored cable 26 is shown with its conductors 27 and 28 connected to the terminals of receptacle 23. A cable clamp 29 is provided adapted to secure cable 26 rigidly to the outlet box and relieve conductors 27 and 28 from any strain which might be transmitted by the suspension of cable 26. Cable clamp 29 also serves to connect the metal outlet box 29 to the armor on cable 26. It is the usual practice to connect the armor of the cable to ground at some point in the wiring circuit of the house. This brings the ground connection through to the outlet box 24. Receptacle 23 is provided with a metal strap 30 through which screws 25 pass to secure the receptacle in outlet box 24. The wall in which the outlet box is secured is not indicated in the drawing. Ordinarily the outlet box is supported in a wall by means of angle supports 31 and 32 extending from the ends of outlet box 24. A face plate 33 is provided to cover a portion of the receptacle 23 and the opening of outlet box 24 to present a neat appearance and also to prevent ready access to the bared portions of conductors 27 and 28 at their point of connection to the receptacle. As indicated in the drawing, face plate 33 is formed of metal stock. However, it is not essential to this invention that the face plate consist of metal. It may be made of any material having either conducting or insulating characteristics. Face plate 33 is ordinarily secured to the receptacle 23 by means of screws such as screw 34 which threads into an aperture provided in the metal strap 30. In place of one of the usual screws 34, screw 21 is substituted. Screw 21 is connected to the ground circuit of the house wiring system through the metal strap 30 supporting the receptacle 23, screw 25, outlet box 24, cable clamp 29 and the armor of cable 26. Thus by connecting the detachable connector 18 to the expanding plug 22 of screw 21, a ground connection is provided for conductor 13. As explained above, the other end of conductor 13 is adapted to be connected to the metal parts of the electrical device to which cord 10 supplies electric current. This completes a ground circuit for the metal parts of the device and prevents the possibility of the metal parts of the device becoming connected to the live side of the circuit to which the attachment cap 14 is connected without blowing a fuse and disconnecting the device from the supply circuit and in consequence prevents the possibility of one operating device receiving a shock therefrom.

From the foregoing it will be seen that an improved electric cord and attachment cap is provided which may be used for connecting an electric device to the electric circuit of the house without the necessity of a special receptacle therefor and in addition a readily detachable connector is provided which merely requires the substitution of a special screw for the screw ordinarily provided for securing a face plate to a receptacle.

What I claim as new and desire to secure by Letters Patent of the United States, is,—

An electric connection for use with a plug receptacle mounted in a grounded outlet box in a wall and provided with a face plate fastened in position by a screw which threads into a member grounded in the outlet box comprising an electric cord having a plurality of conductors, an attachment cap, two contact blades for the attachment cap connected to two of the conductors, a tubular metallic member connected to the end of another of the conductors, and a cooperating metallic screw with an integral expanding plug adapted to replace a face plate screw whereby the screw may serve to fasten the face plate in position and ground the last named conductor to the outlet box.

CHARLES C. SMITH.